(12) United States Patent
Goodrich et al.

(10) Patent No.: US 11,643,495 B2
(45) Date of Patent: *May 9, 2023

(54) ACRYLIC EMULSIONS MODIFIED WITH FUNCTIONAL (METH)ACRYLATES TO ENABLE CROSSLINKING

(71) Applicant: Miwon North America Incorporated, Exton, PA (US)

(72) Inventors: James E. Goodrich, Downingtown, PA (US); Juan G. Nunez, Downers Grove, IL (US)

(73) Assignee: MIWON NORTH AMERICA INCORPORATED, Exton, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/508,497

(22) Filed: Oct. 22, 2021

(65) Prior Publication Data

US 2022/0098348 A1  Mar. 31, 2022

Related U.S. Application Data

(63) Continuation of application No. 16/154,069, filed on Oct. 8, 2018, now Pat. No. 11,155,685.

(60) Provisional application No. 62/571,314, filed on Oct. 12, 2017.

(51) Int. Cl.

| | | |
|---|---|---|
| *C08F 2/48* | (2006.01) | |
| *C08F 263/04* | (2006.01) | |
| *C08F 265/06* | (2006.01) | |
| *C08J 3/28* | (2006.01) | |
| *C08J 5/04* | (2006.01) | |
| *C08J 5/18* | (2006.01) | |
| *C08L 33/10* | (2006.01) | |
| *C09D 133/02* | (2006.01) | |
| *C09D 4/06* | (2006.01) | |
| *C08K 3/08* | (2006.01) | |
| *C08K 5/07* | (2006.01) | |
| *C08F 222/10* | (2006.01) | |

(52) U.S. Cl.
CPC .............. *C08F 263/04* (2013.01); *C08F 2/48* (2013.01); *C08F 265/06* (2013.01); *C08J 3/28* (2013.01); *C08J 5/043* (2013.01); *C08J 5/046* (2013.01); *C08J 5/18* (2013.01); *C08K 3/08* (2013.01); *C08K 5/07* (2013.01); *C08L 33/10* (2013.01); *C09D 4/06* (2013.01); *C09D 133/02* (2013.01); *C08F 222/102* (2020.02); *C08F 222/103* (2020.02); *C08F 222/104* (2020.02); *C08F 222/106* (2020.02); *C08J 2333/08* (2013.01); *C08J 2333/10* (2013.01); *C08K 2003/0818* (2013.01); *C08L 2312/00* (2013.01)

(58) Field of Classification Search
CPC ........ C08F 2/50; C08F 263/04; C08F 265/06; C08F 222/1006; C08J 3/28; C08J 5/043; C08J 5/046; C08J 5/18; C08J 2333/08; C08J 2333/10; C08L 33/10; C08L 2312/00; C09D 151/003; C09D 4/06; C08K 3/08; C08K 5/07; C08K 2003/0818

See application file for complete search history.

(56) References Cited

U.S. PATENT DOCUMENTS

| | | | |
|---|---|---|---|
| 4,101,493 A | 7/1978 | Nakagawa et al. | |
| 4,325,856 A | 4/1982 | Ishikawa et al. | |
| 4,683,165 A | 7/1987 | Lindemann et al. | |
| 4,814,373 A | 3/1989 | Frankel et al. | |
| 5,093,405 A | 3/1992 | Frankel et al. | |
| 5,227,433 A | 7/1993 | Frankel et al. | |
| 5,252,657 A | 10/1993 | Frankel et al. | |
| 5,969,030 A | 10/1999 | Grandhee | |
| 6,683,145 B2 | 1/2004 | Grandhee | |
| 6,855,403 B2 | 2/2005 | Tysak | |
| 7,314,893 B2 | 1/2008 | Hong et al. | |
| 8,216,490 B2 | 7/2012 | Nagano et al. | |
| 8,530,362 B2 | 9/2013 | Nungesser et al. | |
| 11,155,685 B2 * | 10/2021 | Goodrich .................. | C08J 3/28 |
| 2001/0031826 A1 | 10/2001 | Laubender et al. | |
| 2006/0293451 A1 | 12/2006 | Schmitt et al. | |
| 2007/0049663 A1 | 3/2007 | Cordova | |
| 2007/0237903 A1 | 10/2007 | Hiwara et al. | |
| 2011/0104501 A1 | 5/2011 | Watson et al. | |

(Continued)

FOREIGN PATENT DOCUMENTS

| | | |
|---|---|---|
| EP | 0602763 B1 | 10/1997 |
| WO | 2009129033 A1 | 10/2009 |

OTHER PUBLICATIONS

Solvent resistance rub tests https://www.trl.com/paint_solvent/ (Year: 2021).

(Continued)

*Primary Examiner* — Irina S Zemel
*Assistant Examiner* — Jeffrey S Lenihan
(74) *Attorney, Agent, or Firm* — NEO IP

(57) ABSTRACT

The present invention provides a method for crosslinking an acrylic emulsion with a (meth)acrylate monomer or a (meth) acrylate oligomer including adding a base acrylic emulsion to a vessel, adding at least one (meth)acrylate crosslinker to the vessel, incorporating the at least one (meth)acrylate crosslinker into the base acrylic emulsion to create a two-phase system including water and a phase including crosslinkers of the at least one (meth)acrylate crosslinker inside acrylic emulsion particles of the base acrylic emulsion, applying the two-phase system to a surface, and curing the two-phase system to create a final system including a continuous film and crosslinked crosslinkers.

19 Claims, No Drawings

(56) References Cited

U.S. PATENT DOCUMENTS

| | | |
|---|---|---|
| 2011/0263173 A1 | 10/2011 | Nandi |
| 2017/0009111 A1 | 1/2017 | Bauer et al. |
| 2017/0107395 A1 | 4/2017 | Noble et al. |
| 2019/0112435 A1 | 4/2019 | Goodrich et al. |

OTHER PUBLICATIONS

Solvent rub cure testing https://www.diamondvogel.com/industrial/sites/vogelindustrial.com/files/documents/Tech_Brief_7_SolventRubCureTesting.pdf (Year: 2021).
VeoVaTM 10 monomer technical data sheet (Year: 2021).

* cited by examiner

ACRYLIC EMULSIONS MODIFIED WITH FUNCTIONAL (METH)ACRYLATES TO ENABLE CROSSLINKING

CROSS REFERENCE TO RELATED APPLICATIONS

This application is related to and claims priority from the following U.S. patents and patent applications. This application is a continuation of U.S. application Ser. No. 16/154,069, filed Oct. 8, 2018, which claims the benefit of U.S. Provisional Patent Application No. 62/571,314 filed Oct. 12, 2017, each of which is incorporated herein by reference in its entirety.

BACKGROUND OF THE INVENTION

1. Field of the Invention

The present invention relates to water-based acrylic emulsions, and more specifically to crosslinking a water-based acrylic emulsion with a (meth)acrylate monomer or oligomer.

2. Description of the Prior Art

It is generally known in the prior art to provide water-based acrylic emulsions. Water-based acrylic emulsions are advantageous because they minimize the amount of organic solvents, which is required under environmental regulations. Further, it is known in the art to perform multistage polymerization. An aqueous polymer is prepared in a first stage and in at least one additional stage monomers are polymerized in the presence of the first stage aqueous polymer.

Prior art patent documents include the following:

U.S. Pat. No. 4,101,493 for crosslinking emulsion by inventors Nakagawa, et al., filed Jul. 13, 1976 and issued Jul. 18, 1978, is directed to an emulsion of a crosslinking type comprising an oligoester-(meth)acrylate having at least two (meth)acryloyl groups in a molecule, a molecular weight of not more than 1000 per one (meth)acryloyl group, and a boiling point at a normal pressure of at least 200° C. and a polymer emulsion of an oil-in-water type.

U.S. Pat. No. 4,325,856 for sequential emulsion polymerization process by inventors Ishikawa, et al., filed Jan. 2, 1980 and issued Apr. 20, 1982, is directed to aqueous copolymer latexes comprising colloidally dispersed, substantially spheroidal copolymer particles having a predominantly hydrophobic core portion and having a relatively hydrophilic polymeric portion which is preferentially oriented toward the outer surface thereof (e.g., a relatively hydrophilic shell portion) are prepared by (a) first emulsion polymerizing an initial monomer charge to form a first aqueous latex of a substantially linear, relatively hydrophilic polymer and (b) thereafter emulsion polymerizing a major proportion (e.g., from about 50 to about 95 parts by weight) of a second (and relatively more hydrophobic) monomer charge in the presence of a minor proportion (e.g., from about 5 to about 50 parts by weight on a polymer solids basis) of said first, relatively hydrophilic polymer latex.

U.S. Pat. No. 5,252,657 for modified latex polymer composition by inventors Frankel, et al., filed Feb. 2, 1993 and issued Oct. 12, 1993, is directed to modified aqueous dispersions of water-insoluble latex polymer prepared by swelling an initial water-insoluble latex polymer, prepared by emulsion polymerization, with additional ethylenically unsaturated monomer, including at least one monomer with two or more sites of ethylenic unsaturation, and subsequently polymerizing the additional monomer within the swollen latex particles.

U.S. Pat. No. 5,969,030 for waterborne coating compositions containing hydrophobically modified emulsions by inventor Grandhee, filed Jul. 24, 1995 and issued Oct. 19, 1999, is directed to a waterborne coating composition comprising a hydrophobically modified emulsion polymer and a process therefore. The emulsion polymer is formed by first combining hydrophobic polymeric compound and $\alpha,\beta$-ethylenically unsaturated monomer, to form a mixture and subjecting the mixture to high stress techniques to form surfactant stabilized particles of the hydrophobic polymer and monomers, in the aqueous phase. The $\alpha,\beta$-ethylenically unsaturated groups within the particles are co-polymerized to form a hydrophobically modified core polymer. Additional monomers including at least one $\alpha,\beta$-ethylenically unsaturated hydrophilic monomer are then added to the core polymer and polymerized by emulsion polymerization, to form a hydrophobically modified emulsion polymer. To form a coating composition, additional components such as pigments, crosslinkers, plasticizers and solvents are added. The coating is applied to a substrate to form a coated article.

U.S. Publication No. 20050192394 for UV-crosslinkable laminating adhesives by inventors Jung, et al., filed Nov. 6, 2003 and published Sep. 1, 2005, is directed to the use of compositions comprising a copolymer obtainable by multistage free-radical polymerization, in which first an aqueous polymer dispersion is prepared (referred to for short as 1st stage) and in at least one further stage monomers are polymerized in the presence of the resulting polymer dispersion (all further stages referred to for short as 2nd stage).

U.S. Pat. No. 7,723,396 for foam composites with emulsion polymer films by inventor Even, et al., filed Jan. 7, 2008 and issued May 25, 2010, is directed to composites comprising a substrate and a multi-stage latex polymer emulsion film.

U.S. Pat. No. 9,556,284 for emulsion polymer adhesives by inventor Even, et al., filed Jun. 11, 2009 and issued Jan. 31, 2017, is directed to multi-stage polymer emulsions suitable for forming pressure sensitive adhesives with high peel and high temperature cohesion.

SUMMARY OF THE INVENTION

The present invention relates to water-based acrylic emulsions, and more specifically to crosslinking a water-based acrylic emulsion with a (meth)acrylate monomer or oligomer.

In one embodiment, the present invention provides a method for crosslinking an acrylic emulsion with a (meth)acrylate monomer or a (meth)acrylate oligomer including adding a base acrylic emulsion to a vessel, adding at least one (meth)acrylate crosslinker to the vessel, incorporating the at least one (meth)acrylate crosslinker into the base acrylic emulsion to create a two-phase system including water and a phase including crosslinkers of the at least one (meth)acrylate crosslinker inside acrylic emulsion particles of the base acrylic emulsion, applying the two-phase system to a surface, and curing the two-phase system to create a final system including a continuous film and crosslinked crosslinkers.

In another embodiment, the present invention provides a method for crosslinking an acrylic emulsion with a (meth)acrylate monomer or a (meth)acrylate oligomer including adding a base acrylic emulsion to a vessel, wherein the base acrylic emulsion includes at least one permanent counterion, adding at least one (meth)acrylate crosslinker to the vessel, incorporating the at least one (meth)acrylate crosslinker into the base acrylic emulsion to create a two-phase system including water and a phase including crosslinkers of the at least one (meth)acrylate crosslinker inside acrylic emulsion particles of the base acrylic emulsion, applying the two-phase system to a surface, and curing the two-phase system to create a final system including a continuous film and crosslinked crosslinkers using ultraviolet (UV) energy, Light Emitting Diode (LED) energy, electron beam (EB) energy, a thermal crosslinking mechanism, and/or an oxidative crosslinking mechanism.

In yet another embodiment, the present invention provides a method for crosslinking an acrylic emulsion with a (meth)acrylate monomer or a (meth)acrylate oligomer including adding a base acrylic emulsion to a vessel, wherein the base acrylic emulsion is anionic or cationic, neutralizing the base acrylic emulsion using at least one acid or at least one base, adding at least one (meth)acrylate crosslinker to the vessel, incorporating the at least one (meth)acrylate crosslinker into the base acrylic emulsion to create a two-phase system including water and a phase including crosslinkers of the at least one (meth)acrylate crosslinker inside acrylic emulsion particles of the base acrylic emulsion, applying the two-phase system to a surface, and curing the two-phase system to create a final system including a continuous film and crosslinked crosslinkers.

These and other aspects of the present invention will become apparent to those skilled in the art after a reading of the following description of the preferred embodiment.

DETAILED DESCRIPTION

The present invention is generally directed to water-based acrylic emulsions, and more specifically to crosslinking a water-based acrylic emulsion with a (meth)acrylate monomer.

In one embodiment, the present invention provides a method for crosslinking an acrylic emulsion with a (meth)acrylate monomer or a (meth)acrylate oligomer including adding a base acrylic emulsion to a vessel, adding at least one (meth)acrylate crosslinker to the vessel, incorporating the at least one (meth)acrylate crosslinker into the base acrylic emulsion to create a two-phase system including water and a phase including crosslinkers of the at least one (meth)acrylate crosslinker inside acrylic emulsion particles of the base acrylic emulsion, applying the two-phase system to a surface, and curing the two-phase system to create a final system including a continuous film and crosslinked crosslinkers.

In another embodiment, the present invention provides a method for crosslinking an acrylic emulsion with a (meth) acrylate monomer or a (meth)acrylate oligomer including adding a base acrylic emulsion to a vessel, wherein the base acrylic emulsion includes at least one permanent counterion, adding at least one (meth)acrylate crosslinker to the vessel, incorporating the at least one (meth)acrylate crosslinker into the base acrylic emulsion to create a two-phase system including water and a phase including crosslinkers of the at least one (meth)acrylate crosslinker inside acrylic emulsion particles of the base acrylic emulsion, applying the two-phase system to a surface, and curing the two-phase system to create a final system including a continuous film and crosslinked crosslinkers using ultraviolet (UV) energy, Light Emitting Diode (LED) energy, electron beam (EB) energy, a thermal crosslinking mechanism, and/or an oxidative crosslinking mechanism.

In yet another embodiment, the present invention provides a method for crosslinking an acrylic emulsion with a (meth)acrylate monomer or a (meth)acrylate oligomer including adding a base acrylic emulsion to a vessel, wherein the base acrylic emulsion is anionic or cationic, neutralizing the base acrylic emulsion using at least one acid or at least one base, adding at least one (meth)acrylate crosslinker to the vessel, incorporating the at least one (meth)acrylate crosslinker into the base acrylic emulsion to create a two-phase system including water and a phase including crosslinkers of the at least one (meth)acrylate crosslinker inside acrylic emulsion particles of the base acrylic emulsion, applying the two-phase system to a surface, and curing the two-phase system to create a final system including a continuous film and crosslinked crosslinkers.

None of the prior art discloses multi-stage polymerizations to produce emulsions incorporating at least two polymers for the explicit purpose of enabling a secondary chemical reaction of the at least two polymers after air drying. The present invention adds (meth)acrylate monomers and oligomers to pre-established emulsions to enable ultraviolet (UV), electron beam (EB), or oxidative polymerization of the resulting emulsion after air drying and primary film formation has occurred. The added monomers or oligomers are not polymerized within the emulsion, but rather remain liquid and latent until exposed to a secondary curing step. Advantageously, polymerizing the resulting emulsion after air drying and primary film formation has occurred reduces sensitivity to and increases resistance to water and alcohol (e.g., isopropyl alcohol).

As used herein, (meth)acrylate refers to acrylates, methacrylates, and mixtures of the two. Additionally, (meth) acrylic refers to both acrylic, methacrylic, and mixtures of the two. For example, (meth)acrylate refers to methacrylate (e.g., methyl methacrylate, dimethylamino methacrylate), acrylate (e.g., ethyl acrylate, butyl acrylate, isooctyl acrylate), and mixtures of the two.

Water-based acrylic emulsions of various compositions and microstructures are used as the basis of the system. Conventional polymerization techniques may be used to prepare the base acrylic emulsion of the invention. Alternatively, the base acrylic emulsion is a commercially available acrylic emulsion. Examples of commercially available emulsions include, but are not limited to, Trinseo DL 280NA, Celanese Avicor® 384, Celanese Avicor® 325 Celanese Avicor® 2456, Celanese Avicor® 385, Omnova Solutions Pliotec® 7104, Omnova Solutions Pliotec® EL25, Omnova Solutions Pliotec® EL45, Omnova Solutions Pliotec® PA20, Omnova Solutions Pliotec® SC75, Michelman Michem® Emulsion 44730, STI Polymer Sycoat® 2020, STI Polymer Sycoat® 2020, STI Polymer Sycoat® 700, Mallard Creek Polymers Rovene® 6525, Mallard Creek Polymers Rovene® 6001, Mallard Creek Polymers Rovene® 6121, Gellner Industrial Ottopol CS-58, Gellner Industrial Ottopol K-65, Gellner Industrial Ottopol SX-75, StanChem SC 6870, StanChem SC 6904, Arkema ENCOR® 2722, Arkema ENCOR® 626, Arkema ENCOR® 461, Arkema ENCOR® 310, Arkema NEOCAR® 820, BASF Joncryl® 1907, BASF Joncryl® 538-A, and BASF Joncryl® 1984.

In one embodiment, the base acrylic emulsion is formed of a pure acrylic polymer. Alternatively, the base acrylic emulsion incorporates other common co-monomers or microstructures including, but not limited to, methacrylic acid, acrylic acid, methyl methacrylate, ethyl acrylate, butyl acrylate, 2-ethylhexyl acrylate, styrene, butyl methacrylate, vinyl acetate, isooctyl acrylate, lauryl methacrylate, VeoVa™ 10 vinyl ester, dimethylaminoethyl methacrylate, t-butylaminoethyl methacrylate, and 2-methylaminoethyl methacrylate.

In another embodiment, the acrylic emulsion is neutralized in water using at least one neutralizing agent. The at least one neutralizing agent is at least one acid or at least one base, depending on whether the system is anionic or cationic in nature. Neutralizing agents include, but are not limited to, ammonia, methyldiethanolamine, dimethylamino hydroxypropane, 2-amino-2-methyl-1-propanol, sodium hydroxide, potassium hydroxide, sodium tert-butoxide, potassium tert-butoxide, lithium tert-butoxide, diethylmethylamine, acetic acid, and triethanolamine.

Most acrylic emulsions, whether they are anionic or cationic, use a temporary counterion to allow water resistance after air drying. The temporary counterion evaporates after application and drying. It is necessary in traditional acrylic emulsions because most of the systems do not employ an additional crosslinking mechanism and will have water sensitivity under use conditions if the counterion remains in the system. In the present invention, there is the establishment of another, non-water soluble, crosslinked polymer in the system. Water resistance can be given to the system by the resulting polymer, meaning that at least one permanent counterion is useful. In a preferred embodiment, the at least one permanent counterion is sodium, potassium, and/or lithium. The at least one permanent counterion is preferably introduced via the at least one neutralizing agent. It has been shown that using an acrylic polymer with at least one permanent counterion as the base acrylic polymer allows for the system to be water re-soluble after air dry, then not water re-soluble after curing (e.g., UV curing). This is especially useful in applications where easy cleanup of the water dried system is advantageous, including, but not limited to, cleaning of complex pieces of application equipment like thermal and drop-on-demand inkjet heads, slot die coaters, vacuum coaters, and spray applicators.

The base acrylic emulsion is placed into a vessel with low shear mixing capabilities. The system in the vessel is a two-phase system: liquid acrylic polymer particles and water. At least one reactive (meth)acrylate crosslinker is added to the vessel. The nature of the at least one reactive (meth)acrylate crosslinker varies widely depending on the desired properties of the final system. Reactive (meth)acrylate crosslinkers of various molecular weights, functionalities, and backbone structures can be incorporated. Higher $T_g$, harder coatings with a high indentation modulus and no flexibility are created by using monomers and oligomers with higher crosslink density in cooperation with acrylic emulsion polymers with a higher $T_g$. Tough coatings with some flexibility (e.g., automotive coatings) are achieved by using lower functional monomers and oligomers that have reduced functionality/crosslink density.

There are two considerations for the acrylic polymer to (meth)acrylate ratio when making the final system. First, will a particular emulsion accept the desired loading of (meth)acrylate? Second, what film properties are necessary after air dry? Because the unreacted (meth)acrylate in the system acts as a coalescing solvent and/or a plasticizer, having lower ratios of acrylic polymer to (meth)acrylate monomer can lead to an air-dried softer film with a high coefficient of friction and little to no resistance properties to water or solvent. However, the same system would have higher crosslinking and better resistance properties after curing (e.g., UV curing) due to the high amount of (meth)acrylate in the system available for crosslinking and forming the new polymer network. It is a balancing act determined by the chemistry of the emulsion and (meth)acrylate, as well as the properties required of the air-dried and cured films.

The at least one reactive (meth)acrylate crosslinker includes, but is not limited to, hexanediol diacrylate (HDDA), hexanediol dimethacrylate, butanediol diacrylate, butanediol dimethacrylate, trimethylolpropane triacrylate (TMPTA), trimethylolpropane trimethacrylate, pentaerythritol tetraacrylate, pentaerythritol tetramethacrylate, di-trimethylolpropane tetraacrylate (DiTMPTA), dipentaerythritol pentaacrylate (DiPETA), dipentaerythritol pentamethacrylate, dipentaerythritol hexaacrylate, dipentaerythritol hexamethacrylate, nonanediol diacrylate, nonanediol dimethacrylate, decanediol diacrylate, dodecanediol dimethacrylate, tripropylene glycol diacrylate, dipropylene diacrylate, 3-9EO trimethylolpropane triacrylate, 5EO pentaerythritol tetraacrylate, 3-9PO trimethylolpropane triacrylate, tris-hydroxyethyl isocyanurate triacrylate, epoxy acrylate, epoxy methacrylate, propoxylated neopentyl glycol diacrylate, ethoxylated (EO) neopentyl glycol diacrylate, ethylene glycol dimethacrylate, polyethylene glycol diacrylate (PEGDA 200), polyethylene glycol diacrylate (PEGDA 400), 3-methylpentanediol diacrylate, hydroxy pivalic acid neopentyl glycol diacrylate, EO bisphenol A dimethacrylate, EO bisphenol A diacrylate, tricyclodecane dimethanol diacrylate, tricyclodecane dimethanol dimethacrylate, propoxylated glycerol triacrylate, neopentyl glycol dimethacrylate, butanediol dimethacrylate, butylene glycol diacrylate, butylene glycol dimethacrylate, trimethylolpropane diallyl ether methacrylate, trimethylolpropane allyl ether dimethacrylate, hyperbranched polyester polyacrylate, 2-methyl-2-propyl 1,3-propanediol diacrylate, polytetrahydrofuran diacrylate, polytetrahydrofuran dimethacrylate, poly 1,3-propanediol diacrylate, poly 1,3-propanediol dimethacrylate, cyclohexanedimethanol diacrylate, EO cyclohexanedimethanol diacrylate, PO cyclohexanedimethanol dimethacrylate, and/or cyclohexanedimethanol dimethacrylate.

The at least one reactive (meth)acrylate crosslinker is preferably a liquid prior to incorporation into the system. In one embodiment, heat is applied to the at least one reactive (meth)acrylate crosslinker to lower its viscosity for the incorporation process.

Electron beam (EB) curing does not require an additional chemical free radical source. In the case of UV or thermal curing, at least one curing agent is added to the system. For UV curing, the at least one curing agent is a photoinitiator from a family including, but not limited to, alpha hydroxy ketones, alpha amino ketones, benzophenones, and/or phosphine oxides. The photoinitiator is preferably a liquid photoinitiator (e.g., Omnirad 1173, TPO-L) because liquid photoinitiators are easier to incorporate into the final system after the at least one (meth)acrylate crosslinker is incorporated into the emulsion. Alternatively, the photoinitiator is a solid photoinitiator. The solid photoinitiator is preferably added to the at least one (meth)acrylate crosslinker prior to the addition to the emulsion. In one embodiment, 1 part photoinitiator is added to the system for every 10 parts of (meth)acrylate to enable UV cure. In a preferred embodiment, 1 part Omnirad 1173 is added to the system for every 10 parts of (meth)acrylate to enable UV cure. For chemical curing, at least one initiator is added to the system. The at least one initiator includes, but is not limited to, tert-amyl peroxides, tert-butyl peroxides, benzoyl peroxide, bis-peroxides, di-cumyl peroxides, diperoxyketals, peroxy ester, methyl ethyl ketone peroxide, azo nitrile, azo ester, and/or azo amide polymerization initiators.

Like any other waterbased system, many other additives can be added to the system to improve the stability, application, and final coating properties. Examples of such additives include, but are not limited to, defoamers, surface wetting aides, matting agents, organic or inorganic fillers, pigments, rheology modifiers, pH buffers, algaecides, biocides, coalescing solvents, co-solvents, dispersing aides, waxes, adhesion promoters, anti-static agents, and anti-corrosion agents. In one embodiment, at least one additive is introduced to the final system prior to application and curing.

After the addition of the (meth)acrylate crosslinker, there are three phases in the vessel: acrylic polymer particles, water, and the at least one (meth)acrylate crosslinker. The at least one (meth)acrylate crosslinker can be incorporated up to a weight ratio of 1:1 acrylic emulsion solids to the at least one (meth)acrylate crosslinker. Higher ratios of acrylic emulsion solids to the at least one (meth)acrylate crosslinker are preferred as they have less impact on the rheology and stability of the acrylic emulsion.

After a lengthy low shear incorporation process, the at least one (meth)acrylate crosslinker is absorbed into the acrylic polymer particles to create a two-phase system again. The final system shows good stability where the at least one (meth)acrylate crosslinker remains inside the emulsion particles and is not negatively affected by the water in the system. The long-term stability of the system is evaluated using a variety of methods, including, but not limited to, the change in pH, particle size, density, refractive index (RI), opacity, and/or viscosity over time.

The liquid system is then applied to at least one surface by any number of known application methods including, but not limited to, roll coating, inkjet printing, flexo coating, flexo printing, spraying, flood coating, offset coating, and slot die coating. The at least one surface includes, but is not limited to, wood, metal (e.g., tin free steel, aluminum), glass, paper, cardboard, concrete, plaster, composite, leather, and/or plastic (e.g., polyethylene terephthalate (PET), polyvinyl chloride (PVC), biaxially-oriented polypropylene (BOPP), polyethylene (PE), polypropylene (PP), polycarbonate (PC)).

To create the final system, some amount of water removal must be performed. In one embodiment, the substrate (e.g., paper, wood) absorbs the water. Alternatively, the water can be removed by evaporative drying at ambient temperatures, with heat, or with infrared (IR) drying (e.g., for nonporous surfaces).

After water removal, the system has a set of properties primarily established by the acrylic copolymer itself. Unreacted (meth)acrylate crosslinker can affect the properties, most notably decreasing the film's glass transition temperature ($T_g$) and Minimum Film Forming Temperature (MFFT) and increasing its coefficient of friction and flexibility. The $T_g$ of the dried and/or cured system can be evaluated by a few methods, including Dynamic Mechanical Analysis (DMA), Thermogravimetric Analysis (TGA), and Differential Scanning calorimetry (DSC). The MFFT can be evaluated by a MFFT-Bar and following ASTM D2354. The unreacted (meth)acrylate crosslinker can replace coalescing solvents in reducing the MFFT to a temperature where a high quality, continuous film, can be formed at temperatures of use for the application process. Though not as effective at reducing MFFT as specifically designed coalescing solvents, the (meth)acrylate crosslinkers are not completely latent and will later be polymerized to enhance the properties of the final dried and cured films.

After water is removed, the at least one monomer is crosslinked using UV, LED, or electron beam energy. Alternatively, thermal or oxidative crosslinking mechanisms are used.

In one embodiment, the final system incorporates at least one reinforcing material. Examples of reinforcing materials include, but are not limited to, glass fibers, polymer fibers (e.g., aramid fibers), graphite, graphene, nanoparticles (e.g., metals, organics, inorganics), and/or minerals.

Example 1

A 4:1 final emulsion of AP1: TMPTA was prepared according to the following procedure. AP1 is a commercially available anionic acrylic copolymer emulsion, neutralized with ammonia, with 44% solids, and a $T_g$ of 12° C. 129.6 g of AP1 was added to a glass beaker equipped with a variable speed mixer with a low shear mixing blade. No heating or cooling apparatus was used as the blending process was done at room temperature (nominally 25° C.). The mixer was lowered into the emulsion and started mixing at 100 rpm. Four equal additions of 3.6 g TMPTA in each addition were added to the stirring emulsion. A clear, liquid monomer phase was initially present on the bottom of the beaker before it was incorporated into the emulsion. The AP1/TMPTA mixture was mixed at 100 rpm for 2 hours. After the 2 hours, all of the TMPTA was incorporated into the emulsion and no longer appeared on the bottom of the beaker. At this point, if the monomer was not incorporated into the emulsion, then more mixing time would be added. 56 g of deionized water was added to the mixing emulsion to adjust the total solids level to about 36%. After addition of the deionized water, the system was mixed for 15 minutes to ensure complete incorporation. At this point, the final emulsion is established and demonstrates the properties described in the present application.

To make the system UV curable, a photoinitiator must be incorporated. As previously described, liquid photoinitiators (e.g., Omnirad 1173, TPO-L) are preferred due to the ease of incorporation. Under stirring, 1.3 g of Omnirad 1173 was added to the final emulsion and then stirred for 2 hours. After 2 hours, all of the photoinitiator was incorporated and the system was fully prepared for application and testing. All waterbased systems were dried in a forced air oven at 48° C. for 5 min. UV curing was done in focus using a Fusion 600 W/in H lamp at 50 fpm for a total energy of 1.1 J/cm$^2$.

Table 1 illustrates viscosities of examples of a base acrylic emulsion mixed with additional monomers in a 4:1 ratio. Table 1 also includes the viscosity of the base acrylic emulsion (AP1) without an additional monomer. The viscosity was measured on a Brookfield DV3T viscometer equipped with a #18 spindle and a small sample size adapter at 25° C. It would be expected that changing the monomer introduced into the emulsion would yield final emulsions with different viscosities. Further, it would be expected for the viscosity to increase with the addition of the monomer to the emulsion, but, in fact, the opposite happens. The addition of each monomer led to a decrease in viscosity of the final emulsion. This is despite the fact that some of the monomers are higher in viscosity than the base acrylic emulsion. Additionally, there appears to be no trend of viscosity of the monomer and the viscosity of the final emulsion. Different final emulsions were synthesized using a locked weight ratio of 4:1 of AP1 to monomer. The final emulsion was two phases with no signs of leftover monomer in the bottom of the mixing vessel.

TABLE 1

| Emulsion | Monomer | AP1:Monomer | Viscosity (cP, 25° C.) |
|---|---|---|---|
| AP1 | Dipentaerythitol Hexaacrylate | 4:1 | 75 |
| AP1 | Ditrimethylolpropane Tetraacrylate | 4:1 | 90 |
| AP1 | 3EO Trimethylolpropane Triacrylate | 4:1 | 95 |
| AP1 | Trimethylolpropane Triacrylate | 4:1 | 100 |
| AP1 | Hexanediol Diacrylate | 4:1 | 100 |
| AP1 | Tridecyl Acrylate | 4:1 | 52 |
| AP1 | Epoxy Acrylate | 4:1 | 110 |
| AP1 | Butanediol Divinyl Ether | 4:1 | 80 |
| AP1 | None | 1:0 | 140 |

Table 2 illustrates viscosities of examples of a base acrylic emulsion mixed with various ratios of trimethylolpropane triacrylate (TMPTA). For each combination there is generally a preferred ratio that delivers the viscosity, stability, and final film properties that are desired. A higher acrylic polymer to (meth)acrylate ratio is useful where the air-dried film needs to have good drying and hardness before curing (e.g., UV curing). An example of an application where these properties are useful includes, but is not limited to, flexographic printing where the applied ink using the final system would need to dry quickly and survive the abrasion of the rest of the printing process. Alternatively, a lower acrylic polymer to (meth)acrylate ratio would yield a very soft film after air dry, but much better water and mechanical resistance after curing (e.g., UV curing). An example of an application where these properties are useful includes, but is not limited to, a pipe coating on steel. Ratios of 1:1 to 6:1 of AP1 to TMPTA were made and evaluated. The 1:1 ratio did not yield a final emulsion that was only two phases, showing leftover TMPTA in the reactor that could not be incorporated. The 2:1 ratio of AP1 to TMPTA had the lowest viscosity and increased to a maximum viscosity at the 5:1 ratio.

TABLE 2

| Emulsion | AP1:TMPTA | Viscosity (cP, 25° C.) |
|---|---|---|
| AP1 | 6:1 | 107 |
| AP1 | 5:1 | 108 |
| AP1 | 4:1 | 100 |
| AP1 | 3:1 | 90 |
| AP1 | 2:1 | 80 |
| AP1 | 1:0 | 140 |

Table 3 illustrates the pH of examples of a base acrylic emulsion mixed with various ratios of TMPTA at t=0 days, t=7 days, and t=60 days. The pH testing of the final emulsions was completed using an *Apera* Instruments AI311 PH60 Premium Waterproof pH Pocket Tester. It would be expected that incorporating TMPTA would have an effect on the pH of the final emulsion as compared to the base acrylic emulsion. (Meth)acrylate esters in the presence of water are known to hydrolyze back to their starting glycol and unsaturated organic acid. This would have the effect lowering the pH once all of the neutralizing anions are consumed. The AP1 had a pH of 7.8, and that remained unchanged after 60 days of aging at room temperature. Adding higher levels of TMPTA did slightly reduce the pH of the final emulsion at t=0 days. If the TMPTA was not incorporated in the emulsion polymer and still in the aqueous phase, it would be expected for the pH to be lower and greatly decrease over time. A small decrease in the pH of the final emulsion at various ratios was seen, but far less than the expected result.

TABLE 3

| | | pH | | |
|---|---|---|---|---|
| Emulsion | AP1:TMPTA | t = 0 days | t = 7 days | t = 60 days |
| AP1 | 6:1 | 8.1 | 7.8 | 7.5 |
| AP1 | 5:1 | 8.0 | 8.0 | 7.4 |
| AP1 | 4:1 | 8.0 | 7.7 | 7.4 |
| AP1 | 3:1 | 7.9 | 7.6 | 7.3 |
| AP1 | 2:1 | 7.9 | 7.6 | 7.3 |
| AP1 | 1:0 | 7.8 | 7.8 | 7.8 |

Example 2

A 4:1 final emulsion of CP1: TMPTA was prepared according to the following procedure. CP1 is a commercially available cationic acrylic copolymer emulsion, neutralized with acetic acid, with 36% solids, and a $T_g$ of 81° C. 158.5 g of CP1 was added to a glass beaker equipped with a variable speed mixer with a low shear mixing blade. No heating or cooling apparatus was used as the blending process was done at room temperature (nominally 25° C.). The mixer was lowered into the emulsion and started mixing at 100 rpm. Four equal additions of 3.6 g TMPTA in each addition were added to the stirring emulsion. A clear, liquid monomer phase was initially present on the bottom of the beaker before it was incorporated into the emulsion. The CP1/TMPTA mixture was mixed at 100 rpm for 2 hours. After the 2 hours, all of the TMPTA was incorporated into the emulsion and no longer appeared on the bottom of the beaker. At this point, if the monomer was not incorporated into the emulsion, then more mixing time would be added. 27 g of deionized water was added to the mixing emulsion to adjust the total solids level to about 36%. After addition of the deionized water, the system was mixed for 15 minutes to ensure complete incorporation. At this point, the final emulsion is established and demonstrates the properties described in the present application.

To make the system UV curable, a photoinitiator must be incorporated. As previously described, liquid photoinitiators (e.g., Omnirad 1173, TPO-L) are preferred due to the ease of incorporation. Under stirring, 1.3 g of Omnirad 1173 was added to the final emulsion and then stirred for 2 hours. After 2 hours, all of the photoinitiator was incorporated and the system was fully prepared for application and testing. All waterbased systems were dried in a forced air oven at 48° C. for 5 min. UV curing was done in focus using a Fusion 600 W/in H lamp at 50 fpm for a total energy of 1.1 J/cm².

Tables 4-6 illustrate the minimum film forming temperature (MFFT) of examples of a base acrylic emulsion mixed with various additional monomers. The MFFT is a critical performance criterion of acrylic emulsions, and is defined as the minimum temperature at which a dried emulsion will coalesce to form a continuous film on a substrate. The MFFT of the final emulsions were measured using a Rhopoint MMFT Bar 90 Minimum Film Forming Temperature Bar following ASTM D2354 (2018). Tables 4-5 include AP1 as the base acrylic emulsion. Table 6 includes CP1 as the base acrylic emulsion.

Generally, the MFFT of an unmodified emulsion would track near the $T_g$ of the acrylic polymer itself. As shown in Table 4, in the case of a low $T_g$ polymer, like AP1, the addition of a "coalescing solvent" in the form of TMPTA did not affect the MFFT and lower it any further. On the other hand, adding monomers to a high $T_g$ polymer, like CP1, showed a strong decrease in the MFFT of the final emulsion as shown in Table 6. TMPTA showed a stronger decrease of MFFT than DiTMPTA, while both of the acrylate esters had a much weaker decrease on the MFFT than Texanol™ ester alcohol (Eastman Chemical Company).

TABLE 4

| Emulsion | AP1:TMPTA | MFFT (° C.) |
| --- | --- | --- |
| AP1 | 6:1 | −2 |
| AP1 | 4:1 | −2 |
| AP1 | 2:1 | −2 |
| AP1 | 1:0 | −2 |

TABLE 5

| Emulsion | Monomer | AP1:Monomer | MFFT (° C.) |
| --- | --- | --- | --- |
| AP1 | HDDA | 4:1 | −2 |
| AP1 | TMPTA | 4:1 | −2 |
| AP1 | DiTMPTA | 4:1 | −2 |
| AP1 | DiPETA | 4:1 | −2 |
| AP1 | None | 1:0 | −2 |

TABLE 6

| Emulsion | Monomer | CP1:Monomer | MFFT (° C.) |
| --- | --- | --- | --- |
| CP1 | Texanol ™ | 4:1 | −2 |
| CP1 | DiTMPTA | 4:1 | 26 |
| CP1 | TMPTA | 4:1 | 23 |
| CP1 | None | 1:0 | 65 |

Table 7 illustrates the mean particle size of examples of base acrylic emulsions mixed with additional monomers. The mean particle size of the final emulsions was measured using a Malvern Instruments Ltd. Zetasizer S90 with a refractive index (RI) detector. An unexpected result was the effect of adding the monomer into the emulsion. In theory, one would expect the particle size of the acrylic polymer to increase with the addition of a significant amount of monomer. However, as seen in the results in Table 7, the mean particle size of the emulsion stays the same (within the statistical accuracy of the test method). There seems to be an anomaly with the CP1 emulsion where the particle size does decrease a bit. The unexpected result is a good one, showing that a significant amount of monomer can be added into the emulsion without increasing the particle size and negatively affecting the viscosity. This combination allows for the development of higher solid emulsions and no volatile organic compounds (VOCs).

TABLE 7

| Emulsion | Monomer | Polymer:Monomer | Mean Particle Size (nm) |
| --- | --- | --- | --- |
| AP1 | Dipentaerythitol Hexaacrylate | 4:1 | 144 |
| AP1 | Ditrimethylolpropane Tetraacrylate | 4:1 | 146 |
| AP1 | Trimethylolpropane Triacrylate | 6:1 | 148 |
| AP1 | Trimethylolpropane Triacrylate | 4:1 | 142 |
| AP1 | Trimethylolpropane Triacrylate | 2:1 | 147 |
| AP1 | Hexanediol Diacrylate | 4:1 | 150 |
| AP1 | None | 1:0 | 152 |
| CP1 | Texanol ™ | 4:1 | 116 |
| CP1 | Ditrimethylolpropane Tetraacrylate | 4:1 | 122 |
| CP1 | Trimethylolpropane Triacrylate | 4:1 | 129 |
| CP1 | None | 1:0 | 145 |

Example 3

A 4:1 final emulsion of AP2: TMPTA was prepared according to the following procedure. AP2 is a commercially available anionic acrylic copolymer emulsion with 44% solids; neutralized with 0.5% KOH, 0.5% NaOH, and 0.2% ammonia; and a $T_g$ of 12° C. 129.6 g of AP2 was added to a glass beaker equipped with a variable speed mixer with a low shear mixing blade. No heating or cooling apparatus was used as the blending process was done at room temperature (nominally 25° C.). The mixer was lowered into the emulsion and started mixing at 100 rpm. Four equal additions of 3.6 g TMPTA in each addition were added to the stirring emulsion. A clear, liquid monomer phase was initially present on the bottom of the beaker before it was incorporated into the emulsion. The AP2/TMPTA mixture was mixed at 100 rpm for 2 hours. After the 2 hours, all of the TMPTA was incorporated into the emulsion and no longer appeared on the bottom of the beaker. At this point, if the monomer was not incorporated into the emulsion, then more mixing time would be added. 56 g of deionized water was added to the mixing emulsion to adjust the total solids level to about 36%. After addition of the deionized water, the system was mixed for 15 minutes to ensure complete incorporation. At this point, the final emulsion is established and demonstrates the properties described in the present application.

To make the system UV curable, a photoinitiator must be incorporated. As previously described, liquid photoinitiators (e.g., Omnirad 1173, TPO-L) are preferred due to the ease of incorporation. Under stirring, 1.3 g of Omnirad 1173 was added to the final emulsion and then stirred for 2 hours. After 2 hours, all of the photoinitiator was incorporated and the system was fully prepared for application and testing. All waterbased systems were dried in a forced air oven at 48° C. for 5 min. UV curing was done in focus using a Fusion 600 W/in H lamp at 50 fpm for a total energy of 1.1 J/cm².

TABLE 8

| Emulsion | Polymer:TMPTA | Slide Angle After Air Dry | IPA Resistance After Air Dry (# double rubs) | Water Resistance After Air Dry (# double rubs) |
| --- | --- | --- | --- | --- |
| AP1 | 4:1 | 62° | 5 | >200 |
| AP1 | 2:1 | 58° | 5 | >200 |
| CP1 | 4:1 | 50° | 2 | >200 |

TABLE 8-continued

| Emulsion | Polymer:TMPTA | Slide Angle After Air Dry | IPA Resistance After Air Dry (# double rubs) | Water Resistance After Air Dry (# double rubs) |
|---|---|---|---|---|
| CP1 | 2:1 | 45° | 3 | >200 |
| AP2 | 4:1 | 46° | 4 | 3 |
| AP2 | 2:1 | 57° | 5 | 2 |

TABLE 9

| Emulsion | Polymer:TMPTA | Slide Angle After UV Cure | IPA Resistance After UV Cure (# double rubs) | Water Resistance After UV Cure (# double rubs) |
|---|---|---|---|---|
| AP1 | 4:1 | 28° | 5 | >200 |
| AP1 | 2:1 | 30° | 23 | >200 |
| CP1 | 4:1 | 32° | >200 | >200 |
| CP1 | 2:1 | 36° | >200 | >200 |
| AP2 | 4:1 | 32° | 40 | >200 |
| AP2 | 2:1 | 34° | 40 | >200 |

Example 4

A 4:1 final emulsion of VAE1: TMPTA was prepared according to the following procedure. VAE1 is a commercially available vinyl acetate/acrylic copolymer emulsion, alkoxylated nonyl phenol (APE) free, with 55% solids, and a $T_g$ of 20° C. 126.4 g of VAE1 was added to a glass beaker equipped with a variable speed mixer with a low shear mixing blade. No heating or cooling apparatus was used as the blending process was done at room temperature (nominally 25° C.). The mixer was lowered into the emulsion and started mixing at 100 rpm. Four equal additions of 4.4 g TMPTA in each addition were added to the stirring emulsion. A clear, liquid monomer phase was initially present on the bottom of the beaker before it was incorporated into the emulsion. The VAE1/TMPTA mixture was mixed at 100 rpm for 2 hours. After the 2 hours, all of the TMPTA was incorporated into the emulsion and no longer appeared on the bottom of the beaker. At this point, if the monomer was not incorporated into the emulsion, then more mixing time would be added. 56 g of deionized water was added to the mixing emulsion to adjust the total solids level to about 44%. After addition of the deionized water, the system was mixed for 15 minutes to ensure complete incorporation. At this point, the final emulsion is established and demonstrates the properties described in the present application.

To make the system UV curable, a photoinitiator must be incorporated. As previously described, liquid photoinitiators (e.g., Omnirad 1173, TPO-L) are preferred due to the ease of incorporation. Under stirring, 0.8 g of Omnirad 1173 was added to the final emulsion and then stirred for 2 hours. After 2 hours, all of the photoinitiator was incorporated and the system was fully prepared for application and testing. All waterbased systems were dried in a forced air oven at 48° C. for 5 min. UV curing was done in focus using a Fusion 600 W/in H lamp at 50 fpm for a total energy of 1.1 J/cm².

Example 5

A 4:1 final emulsion of VAE2: TMPTA was prepared according to the following procedure. VAE2 is a commercially available vinyl acetate/ethylene copolymer emulsion, alkoxylated nonyl phenol (APE) free, with 55% solids, and a $T_g$ of 13° C. 126.4 g of VAE2 was added to a glass beaker equipped with a variable speed mixer with a low shear mixing blade. No heating or cooling apparatus was used as the blending process was done at room temperature (nominally 25° C.). The mixer was lowered into the emulsion and started mixing at 100 rpm. Four equal additions of 4.4 g TMPTA in each addition were added to the stirring emulsion. A clear, liquid monomer phase was initially present on the bottom of the beaker before it was incorporated into the emulsion. The VAE2/TMPTA mixture was mixed at 100 rpm for 2 hours. After the 2 hours, all of the TMPTA was incorporated into the emulsion and no longer appeared on the bottom of the beaker. At this point, if the monomer was not incorporated into the emulsion, then more mixing time would be added. 56 g of deionized water was added to the mixing emulsion to adjust the total solids level to about 44%. After addition of the deionized water, the system was mixed for 15 minutes to ensure complete incorporation. At this point, the final emulsion is established and demonstrates the properties described in the present application.

To make the system UV curable, a photoinitiator must be incorporated. As previously described, liquid photoinitiators (e.g., Omnirad 1173, TPO-L) are preferred due to the ease of incorporation. Under stirring, 0.8 g of Omnirad 1173 was added to the final emulsion and then stirred for 2 hours. After 2 hours, all of the photoinitiator was incorporated and the system was fully prepared for application and testing. All waterbased systems were dried in a forced air oven at 48° C. for 5 min. UV curing was done in focus using a Fusion 600 W/in H lamp at 50 fpm for a total energy of 1.1 J/cm².

After air dry, films based on VAE1 and VAE2 at all ratios were still tacky to touch. After UV cure, the films were no longer tacky and had a high coefficient of friction (CoF). Table 10 includes the viscosity of the resulting emulsion and the pH of the emulsion at t=0 days, t=7 days, and t=60 days.

TABLE 10

| | | | pH | | |
|---|---|---|---|---|---|
| Emulsion | VAE:TMPTA | Viscosity (cP, 25° C.) | t = 0 days | t = 7 days | t = 60 days |
| VAE1 | 1:0 | 700 | 5.4 | 5.4 | 5.6 |
| VAE1 | 2:1 | 111 | 5.5 | 6.4 | 5.9 |
| VAE1 | 4:1 | 15 | 5.6 | 6.6 | 5.9 |
| VAE1 | 6:1 | 13 | 5.5 | 6.1 | 5.5 |
| VAE2 | 1:0 | 70 | 4.2 | 4.2 | 4.2 |
| VAE2 | 2:1 | 8 | 4.5 | 4.3 | 4.4 |
| VAE2 | 4:1 | 9 | 4.3 | 4.3 | 4.3 |
| VAE2 | 6:1 | 11 | 4.3 | 4.3 | 4.3 |

As previously described, the base acrylic emulsion is an emulsion polymer. When the process was used to make a 4:1 solution of acrylic polymer to TMPTA system, the monomer was never received by the polymer and remained as a second phase in the bottom of the mixing beaker. Various ratios and (meth)acrylates were tried without success. It was therefore deemed that emulsions had to be used because the (meth)acrylates preferentially migrated to the polymer phase of the emulsion and out of the water phase.

Additionally, the at least one (meth)acrylate crosslinker is preferably not a urethane acrylate or an amine modified acrylate. The urethane acrylate and the amine modified acrylate showed a poor ability to create a final system, likely because the amino functionality in these oligomers interacted with the high aid value of the shell acrylic copolymer and limited their migration into the core of the emulsion polymer.

The above-mentioned examples are provided to serve the purpose of clarifying the aspects of the invention, and it will be apparent to one skilled in the art that they do not serve to limit the scope of the invention. By way of example, the base acrylic emulsion may be neutral, anionic, or cationic. Also by way of example, the base acrylic emulsion may include a temporary counterion or a permanent counterion. By nature, this invention is highly adjustable, customizable and adaptable. The above-mentioned examples are just some of the many configurations that the mentioned components can take on. All modifications and improvements have been deleted herein for the sake of conciseness and readability but are properly within the scope of the present invention.

What is claimed is:

1. A method for crosslinking an acrylic emulsion with a (meth)acrylate monomer or a (meth)acrylate oligomer comprising:
    adding a base acrylic emulsion to a vessel wherein the base acrylic emulsion includes at least one permanent counterion;
    adding at least one (meth)acrylate crosslinker to the vessel;
    incorporating the at least one (meth)acrylate crosslinker into the base acrylic emulsion through low shear mixing to create a two-phase system including water and a phase including the at least one (meth)acrylate crosslinker inside acrylic emulsion particles of the base acrylic emulsion;
    applying the two-phase system to a surface;
    removing the water from the two-phase system to create a dried system including a continuous film including uncrosslinked crosslinkers; and
    curing the dried system to create a final system including a continuous film including crosslinked crosslinkers;
    wherein the viscosity of the two-phase system is lower than the viscosity of the base acrylic emulsion.

2. The method of claim 1, wherein curing the dried system is accomplished using ultraviolet (UV) energy, Light Emitting Diode (LED) energy, electron beam (EB) energy, a thermal crosslinking mechanism, and/or an oxidative crosslinking mechanism.

3. The method of claim 1, wherein the pH of the two-phase system changes less than 0.6 over 60 days.

4. The method of claim 1, wherein the crosslinkers are monomers and/or oligomers.

5. The method of claim 1, wherein the base acrylic emulsion is anionic or cationic.

6. The method of claim 5, wherein the base acrylic emulsion is neutralized with at least one acid or at least one base.

7. The method of claim 1, wherein the at least one permanent counterion includes sodium, potassium, and/or lithium.

8. The method of claim 1, wherein the surface is wood, metal, glass, paper, cardboard, concrete, plaster, composite, leather, and/or plastic.

9. The method of claim 1, wherein the base acrylic emulsion incorporates methacrylic acid, acrylic acid, methyl methacrylate, ethyl acrylate, butyl acrylate, 2-ethylhexyl acrylate, styrene, butyl methacrylate, vinyl acetate, isooctyl acrylate, lauryl methacrylate, dimethylaminoethyl methacrylate, t-butylaminoethyl methacrylate, and/or 2-methylaminoethyl methacrylate.

10. The method of claim 1, wherein the at least one (meth)acrylate crosslinker includes hexanediol diacrylate (HDDA), hexanediol dimethacrylate, butanediol diacrylate, butanediol dimethacrylate, trimethylolpropane triacrylate (TMPTA), trimethylolpropane trimethacrylate, pentaerythritol tetraacrylate, pentaerythritol tetramethacrylate, di-trimethylolpropane tetraacrylate (DiTMPTA), dipentaerythritol pentaacrylate (DiPETA), dipentaerythritol pentamethacrylate, dipentaerythritol hexaacrylate, dipentaerythritol hexamethacrylate, nonanediol diacrylate, nonanediol dimethacrylate, decanediol diacrylate, dodecanediol dimethacrylate, tripropylene glycol diacrylate, dipropylene diacrylate, 3-9EO trimethylolpropane triacrylate, 5EO pentaerythritol tetraacrylate, 3-9PO trimethylolpropane triacrylate, tris-hydroxyethyl isocyanurate triacrylate, epoxy acrylate, epoxy methacrylate, propoxylated neopentyl glycol diacrylate, ethoxylated (EO) neopentyl glycol diacrylate, ethylene glycol dimethacrylate, polyethylene glycol diacrylate (PEGDA 200), polyethylene glycol diacrylate (PEGDA 400), 3-methylpentanediol diacrylate, hydroxy pivalic acid neopentyl glycol diacrylate, EO bisphenol A dimethacrylate, EO bisphenol A diacrylate, tricyclodecane dimethanol diacrylate, tricyclodecane dimethanol dimethacrylate, propoxylated glycerol triacrylate, neopentyl glycol dimethacrylate, butanediol dimethacrylate, butylene glycol diacrylate, butylene glycol dimethacrylate, trimethylolpropane diallyl ether methacrylate, trimethylolpropane allyl ether dimethacrylate, hyperbranched polyester polyacrylate, 2-methyl-2-propyl 1,3-propanediol diacrylate, polytetrahydrofuran diacrylate, polytetrahydrofuran dimethacrylate, poly 1,3-propanediol diacrylate, poly 1,3-propanediol dimethacrylate, cyclohexanedimethanol diacrylate, EO cyclohexanedimethanol diacrylate, PO cyclohexanedimethanol dimethacrylate, and/or cyclohexanedimethanol dimethacrylate.

11. The method of claim 1, further comprising incorporating at least one photoinitiator prior to applying the two-phase system to the surface.

12. The method of claim 11 wherein the at least one photoinitiator is from a family consisting of alpha hydroxy ketones, alpha amino ketones, benzophenones, and/or phosphine oxides.

13. The method of claim 1, further comprising incorporating at least one additive prior to applying the two-phase system to the surface, wherein the at least one additive is at least one defoamer, at least one surface wetting aid, at least one matting agent, at least one organic filler, at least one inorganic filler, at least one pigment, at least one rheology modifier, at least one pH buffer, at least one algaecide, at least one biocide, at least one coalescing solvent, at least one co-solvent, at least one dispersing aid, at least one wax, at least one adhesion promoter, at least one anti-static agent, and/or at least one anti-corrosion agent.

14. The method of claim 1, wherein the at least one (meth)acrylate crosslinker is incorporated up to a weight ratio of 1:1 acrylic emulsion solids to the at least one (meth)acrylate crosslinker.

15. The method of claim 1, wherein the two-phase system is applied to the surface using roll coating, inkjet printing, flexo coating, flexo printing, spraying, flood coating, offset coating, or slot die coating.

16. A method for crosslinking an acrylic emulsion with a (meth)acrylate monomer or a (meth)acrylate oligomer comprising:
    adding a base acrylic emulsion to a vessel;
    adding at least one (meth)acrylate crosslinker to the vessel;

incorporating at least one (meth)acrylate crosslinker into the base acrylic emulsion to create a two-phase system including water and a phase including the at least one (meth)acrylate crosslinker inside acrylic emulsion particles of the base acrylic emulsion;

applying the two-phase system to a surface;

removing the water from the two-phase system to create a dried system including a continuous film including uncrosslinked crosslinkers; and curing the dried system to create a final system including a continuous film including crosslinked crosslinkers; and wherein the pH of the two-phase system changes less than 0.6 over 60 days.

17. The method of claim 16, wherein the base acrylic emulsion includes at least one counterion.

18. The method of claim 17, wherein the at least one counterion includes a permanent counterion.

19. A continuous film formed by crosslinking an acrylic emulsion with a (meth)acrylate monomer or a (meth)acrylate oligomer formed via the steps of:

adding a base acrylic emulsion to a vessel, wherein the base acrylic emulsion is anionic or cationic;

adding at least one (meth)acrylate crosslinker to the vessel;

incorporating at least one (meth)acrylate crosslinker into the base acrylic emulsion to create a two-phase system including water and a phase including the at least one (meth)acrylate crosslinker inside acrylic emulsion particles of the base acrylic emulsion;

applying the two-phase system to a surface;

removing the water from the two-phase system to create a dried system including a continuous film including uncrosslinked crosslinkers; and curing the dried system to create the final system including the continuous film including crosslinked crosslinkers;

wherein the viscosity of the two-phase system is lower than the viscosity of the base acrylic emulsion; and wherein the pH of the two-phase system changes less than 0.6 over 60 days.

* * * * *